US012310397B2

(12) United States Patent
Del Borrello et al.

(10) Patent No.: US 12,310,397 B2
(45) Date of Patent: May 27, 2025

(54) METHOD AND APPARATUS TO CAST A SHEET OF MATERIAL CONTAINING ALKALOIDS

(71) Applicant: PHILIP MORRIS PRODUCTS S.A., Neuchatel (CH)

(72) Inventors: Michele Del Borrello, Vasto (IT); Clemente Iadanza, Cosenza (IT); Ivan Prestia, Calderara di Reno (IT); Sandro Sartini, Bologna (IT)

(73) Assignee: Philip Morris Products S.A., Neuchatel (CH)

( * ) Notice: Subject to any disclaimer, the term of this patent is extended or adjusted under 35 U.S.C. 154(b) by 523 days.

(21) Appl. No.: 17/626,220

(22) PCT Filed: Jun. 23, 2020

(86) PCT No.: PCT/EP2020/067554
§ 371 (c)(1),
(2) Date: Jan. 11, 2022

(87) PCT Pub. No.: WO2021/008828
PCT Pub. Date: Jan. 21, 2021

(65) Prior Publication Data

US 2022/0287354 A1 Sep. 15, 2022

(30) Foreign Application Priority Data

Jul. 17, 2019 (EP) .................................... 19186862

(51) Int. Cl.
*A24B 3/14* (2006.01)
*A24B 15/18* (2006.01)
(Continued)

(52) U.S. Cl.
CPC ................ *A24B 3/14* (2013.01); *A24B 15/18* (2013.01); *A24C 5/01* (2020.01); *F17D 1/14* (2013.01); *F17D 3/01* (2013.01)

(58) Field of Classification Search
None
See application file for complete search history.

(56) References Cited

U.S. PATENT DOCUMENTS 3,415,253 A 12/1968 Michels
5,997,691 A 12/1999 Gautam
(Continued)

FOREIGN PATENT DOCUMENTS

WO WO 2016/050470 4/2016

OTHER PUBLICATIONS

PCT International Search Report and Written Opinion for PCT/EP2020/067554 mailed Sep. 14, 2020 (15 pages).

*Primary Examiner* — Philip Y Louie
*Assistant Examiner* — Nicole A Szumigalski
(74) *Attorney, Agent, or Firm* — Mueting Raasch Group

(57) ABSTRACT

The invention relates to a method for casting a sheet of a material containing alkaloids, the method comprising: —forming a slurry of the material containing alkaloids, the slurry having a viscosity value; —storing the slurry in a first tank; —providing a first flow-path and a second flow-path for fluid communication between the first tank and a casting box, the first flow-path comprising a first pump and the second flow-path comprising a second pump; —directing the slurry either along the first flow-path or along the second flow-path from the first tank to the casting box, defining a flow of slurry through the first flow-path or through the second flow-path, on the basis of the viscosity value of the slurry; and —casting the slurry to obtain a sheet of material containing alkaloids. The invention further relates to a
(Continued)

casting apparatus for the production of a sheet of material containing alkaloids.

10 Claims, 4 Drawing Sheets

(51) Int. Cl.

| | |
|---|---|
| ***A24C 5/01*** | (2020.01) |
| ***F17D 1/14*** | (2006.01) |
| ***F17D 3/01*** | (2006.01) |

(56) References Cited

U.S. PATENT DOCUMENTS

| | | | | |
|---|---|---|---|---|
| 6,198,537 | B1 | 3/2001 | Bokelman | |
| 2002/0011319 | A1 * | 1/2002 | Shakespeare | D21F 7/06<br>162/259 |
| 2007/0084476 | A1 | 4/2007 | Yang | |
| 2015/0338027 | A1 * | 11/2015 | Nakai | F04B 49/08<br>137/12 |
| 2017/0030359 | A1 * | 2/2017 | Fowler | F04D 15/0066 |
| 2018/0368465 | A1 * | 12/2018 | Rosado | A24B 3/08 |

* cited by examiner

METHOD AND APPARATUS TO CAST A SHEET OF MATERIAL CONTAINING ALKALOIDS

This application is a U.S. National Stage Application of International Application No. PCT/EP2020/067554 filed Jun. 23, 2020, which was published in English on Jan. 21, 2021, as International Publication No. WO 2021/008828 A1. International Application No. PCT/EP2020/067554 claims priority to European Application No. 19186862.9 filed Jul. 17, 2019.

This invention relates to a casting apparatus and method for producing a cast sheet of a material containing alkaloids.

In particular, the material containing alkaloids is a homogenized tobacco material, preferably used in an aerosol-generating article such as, for example, a cigarette or a "heat-not-burn" type tobacco containing product.

Today, in the manufacture of tobacco products, besides tobacco leaves, also homogenized tobacco material is used.

In a "heat-not-burn" aerosol-generating article, an aerosol-forming substrate is heated to a relatively low temperature, in order to form an aerosol but prevent combustion of the tobacco material. Further, the tobacco present in the homogenized tobacco material is typically the only tobacco, or includes the majority of the aerosol forming substrate of such a "heat—not burn" aerosol-generating article. This means that the aerosol composition that is generated by such a "heat—not burn" aerosol-generating article is substantially only based on the homogenized tobacco material. Therefore, it is important to have good control over the composition and the mechanical characteristics of the homogenized tobacco material, for example, of the taste of the aerosol.

The homogenized tobacco material is produced by mixing different components, including tobacco powder, to form a tobacco slurry. This slurry is then stored in tanks before being sent, through a suitable delivery system, to a casting system where it enters a "casting box" to be cast on a moving conveyor steel belt and then dried into a dryer.

A specific amount of slurry is preferably required in the casting box to assure a continuous and homogeneous casting. Alternatively or additionally, a substantially constant pressure inside the casting box is preferred to assure a continuous and homogeneous casting. It has been found that the homogeneity and quality of the cast sheet may also depends on the amount of slurry and the pressure in the casting box. In order to have control of the amount of slurry delivered into the casting box, the delivery system which connects the slurry tank to the casting box generally comprises a pump and a control loop. In such a control loop, the slurry flow-rate pumped from the slurry tanks is adjusted according to the measured flow rate of slurry coming out of the casting box.

However, this regulation may be imprecise in case of slurry having a variable density from one batch to another or within the batch. The density of the slurry may vary, for example because of chemical reactions in the slurry, such as for example, gelling. Indeed, in case of large density variations, the pump might not be able to deliver the required flow rate to the casting box.

There is a need for a casting apparatus and method for the production of a cast sheet of a material containing alkaloids that may adapt to variations in slurry characteristics. Further, it would be advantageous to have a casting apparatus and method with a good control over the slurry flow rate to the casting box.

The invention relates to a casting apparatus to cast a sheet of a material containing alkaloids, the method comprising:

forming a slurry of the material containing alkaloids, the slurry having a viscosity value; storing the slurry in a first tank; providing a first flow-path and a second flow-path for fluid communication between the first tank and a casting box. The first flow-path comprises a first pump and the second flow-path comprises a second pump. The method comprises the step of directing the slurry either along the first flow-path or along the second flow-path from the first tank to the casting box, defining a flow of slurry through the first flow-path or second flow-path, on the basis of the viscosity value of the slurry. The method comprises the step of casting the slurry to obtain a sheet of material containing alkaloids.

The invention also relates to a casting apparatus for the production of a sheet of material containing alkaloids, the apparatus comprising: a first tank to store a slurry of material containing alkaloids; a casting box including a casting device to cast a sheet of material containing alkaloids; a viscosity evaluator to measure or determine a viscosity value of the slurry; a first flow-path fluidly connecting the first tank and the casting box to direct a flow of slurry to the casting box; a second flow-path fluidly connecting the first tank and the casting box to direct a flow of slurry to the casting box; a first pump and a second pump, said first pump being arranged within the first flow-path and the second pump being arranged within the second flow-path. The casting apparatus comprises a first valve to selectively open either the first flow-path or second flow-path to allow the flow of slurry from the first tank to the casting box either via the first flow-path or via the second flow-path. The casting apparatus comprises a control element to operate the first valve to select either the first flow-path or the second flow-path on the basis of the viscosity value of the slurry.

Slurries having a wide range of viscosities may be used in the present invention. The viscosity of the slurry could vary from one preparation to the other or could vary over time within the same preparation. Depending on the value of the viscosity, a different flow-path for the slurry from the tank to the casting box is selected. The flow-path is selected so that a suitable pump for that density value of the slurry, for example a pump capable to deliver the requested flow rate of slurry to the casting box, can be used. This way, an adapted flow rate can be ensured to the casting box with slurry having different viscosities.

As used herein, the terms "sheet" denotes a laminar element having a width and length substantially greater than the thickness thereof. The width of a sheet is preferably greater than about 10 millimeters, more preferably greater than about 20 millimeters or about 30 millimeters. Even more preferably, the width of the sheet is comprised between about 60 millimeters and about 300 millimeters. The thickness of the sheet is preferably comprised between about 50 micrometers and about 300 micrometers, more preferably the thickness of the sheet is comprised between about 100 micrometers and about 250 micrometers, even more preferably between about 130 micrometers and 220 micrometers.

As used herein, the term "slurry" denotes a liquid-like, viscous or pasty material that may comprise an emulsion of different liquid-like, viscous or pasty material. The slurry may contain a certain amount of solid-state particles, provided that the slurry still shows a liquid-like, viscous or pasty behavior.

In the following, with the term "upstream" or "downstream", reference is made to the direction of flow of the slurry.

As used herein, the term “movable support” denotes any means comprising a surface that can be moved in at least one longitudinal direction. The movable support may form a closed loop so as to provide an uninterrupted transporting ability in one direction. However, the movable support may be moved in a reciprocating way as well. The movable support may include a conveyor belt. The movable support may be essentially flat and may show a structured or an unstructured surface. The movable support may be entirely liquid impermeable. This prevents slurry from passing inadvertently through the support. In other embodiments, the movable support may comprise openings in its surface. Preferably, the openings are of such a size that they are air permeable but still not liquid permeable. Such openings may improve the removal of moisture from the slurry applied to the movable support by allowing water vapor to also escape through the movable support and not only through the outer surface of the forming sheet created by the slurry. When drying, the slurry tends to form an outer dry layer. The outer dry layer may form a barrier to moisture from escaping from the slurry below the outer dry layer. Accordingly, provision of openings in the movable support may lead to more consistent drying of the slurry across the entire thickness of the forming sheet. The movable support may comprise a sheet-like movable and bendable band. The band may be made of a metallic material, including but not limited to steel, copper, iron alloys and copper alloys, or of a rubber material. The band may be made of a temperature-resistant material so that it can be heated to speed up the drying process of the slurry.

A “material containing alkaloids” is a material which contains one or more alkaloids. The alkaloids may comprise nicotine. The nicotine may be found, for example, in tobacco.

Alkaloids are a group of naturally occurring chemical compounds that mostly contain basic nitrogen atoms. This group also includes some related compounds with neutral and even weakly acidic properties. Some synthetic compounds of similar structure are also termed alkaloids. In addition to carbon, hydrogen and nitrogen, alkaloids may also contain oxygen, sulfur and, more rarely, other elements such as chlorine, bromine, and phosphorus. Alkaloids are produced by a large variety of organisms including bacteria, fungi, and plants. They can be purified from crude extracts of these organisms by acid-base extraction. Caffeine, nicotine, theobromine, atropine, tubocurarine are examples of alkaloids.

As used herein, the term “homogenized tobacco material” denotes material formed by agglomerating particulate tobacco, which contains the alkaloid nicotine. The material containing alkaloids can thus be a homogenized tobacco material.

The most commonly used forms of homogenized tobacco material is reconstituted tobacco sheet and cast leaf. The process to form homogenized tobacco material sheets commonly comprises a step in which tobacco powder and a binder, are mixed to form a slurry. The slurry is then used to create a tobacco sheet. For example by casting a viscous slurry onto a moving metal belt to produce so called cast leaf. Alternatively, a slurry with low viscosity and high water content can be used to create reconstituted tobacco in a process that resembles paper-making.

The sheet material of tobacco can be referred to as a reconstituted sheet material and formed using particulate tobacco (for example, reconstituted tobacco) or a tobacco particulate blend, a humectant and an aqueous solvent to form the tobacco composition.

The homogenized tobacco sheet generally includes, in addition to the tobacco, a binder and an aerosol-former, such as guar and glycerin.

The term “aerosol-forming substrate” refers to a substrate that is capable of releasing volatile compounds that may form an aerosol. Generally, the aerosol is suitable to be inhaled by a user. Typically, aerosol-forming substrates release volatile compounds upon heating. The aerosol-forming substrate may include the material containing volatile alkaloids flavor compounds, which are released from the aerosol-forming substrate upon heating. The aerosol-forming substrate may include homogenized material.

As used herein, the term “aerosol-generating device” refers to a device configured to interact with an aerosol-forming substrate to generate aerosol. Preferably, the aerosol-generating device includes an aerosolizer, such as a heater.

The sheet of material containing alkaloids may be used as aerosol-forming substrate for an aerosol generating device.

The slurry may comprise a number of different components or ingredients. These components may influence the properties of the cast sheet of material containing alkaloids. A first ingredient is a material containing alkaloids, for example in powder form. This material can be for example a tobacco powder blend. Preferably the tobacco powder blend contains the majority of the tobacco present in the slurry. This way, the tobacco powder blend is the source of the majority of tobacco in the homogenized tobacco material. As such, the tobacco powder blend defines the flavor to the final product, for example to an aerosol produced by heating the homogenized tobacco material.

A binder is preferably added in order to enhance the tensile properties of the homogenized sheet. An aerosol-former is preferably added to promote the formation of aerosol. Further, in order to reach a certain viscosity and moisture for casting the web of material containing alkaloids, water may be added to the slurry.

The quantity of binder added to the slurry may be comprised between about 1 percent and about 5 percent in dry weight of the slurry. More preferably, it is comprised between about 2 percent and about 4 percent. The binder used in the slurry may be any of the gums or pectins described herein. The binder may ensure that the tobacco powder remains substantially dispersed throughout the homogenized tobacco web. Although any binder may be employed, preferred binders are natural pectins, such as fruit, citrus or tobacco pectins; guar gums, such as hydroxyethyl guar and hydroxypropyl guar; locust bean gums, such as hydroxyethyl and hydroxypropyl locust bean gum; alginate; starches, such as modified or derivitized starches; celluloses, such as methyl, ethyl, ethylhydroxymethyl and carboxymethyl cellulose; tamarind gum; dextran; pullalon; konjac flour; xanthan gum and the like. The particularly preferred binder for use in the present invention is guar.

A cellulose pulp containing cellulose fibres is preferably added to the slurry in order to increase the tensile strength of the alkaloids material web, acting as a strengthening agent. The introduction of cellulose fibres in the slurry typically increases the tensile strength of the tobacco material web, acting as a strengthening agent. Therefore, adding cellulose fibres may increase the resilience of the homogenized tobacco material web. Cellulose fibres for including in a slurry for homogenized tobacco material are known in the art and include, but are not limited to: soft-wood fibres, hard wood fibres, jute fibres, flax fibres, tobacco fibres and combination thereof. In addition to pulping, the cellulose fibres might be subjected to suitable processes such as refining, mechanical pulping, chemical pulping, bleaching, sulphate pulping and combination thereof. Cellulose fibres may include tobacco stem materials, stalks or other tobacco plant material. Preferably, cellulose fibres such as wood fibres comprise a low lignin content. Alternatively, fibres, such as vegetable fibres, may be used either with the above fibres or in the alternative, including hemp and bamboo. The mean length of cellulose fibres is advantageously between about 0.2 millimetres and about 4 millimetres. Preferably, the mean length per weight of the cellulose fibres is between about 1 millimetre and about 3 millimetres. Further, preferably, the amount of the cellulose fibres is comprised between about 1 percent and about 7 percent in dry weight basis of the total weight of the slurry (or homogenized tobacco sheet).

The mean length of the fibers refers to their real length (regardless whether they are curled or have kinks) as measured by MORFI COMPACT commercialised by Techpap SAS. The mean length is the mathematical mean of the measured length of the fibers by MORFI COMPACT over a measurement of N fibers, where N>5. The MORFI COMPACT is a fiber analyser that measures the length of the fibers following the framework of the fibers, thus measuring their real developed length. Measured objects are considered fibers if their length is comprised between 200 microns and 10000 microns and their width is comprised between 5 microns and 75 microns. Fibers length is measured when deionized water is added to the fibers and Morfi software is used.

The fibres in the substrate sheet could be woven or not woven. If not woven, the fibres may be oriented predominantly in one direction. Also, the fibres may be for example randomly oriented. If woven, various patterns could be used.

Suitable aerosol-formers for inclusion in slurry for sheet of material containing alkaloids are known in the art and include, but are not limited to: monohydric alcohols like menthol, polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate.

Examples of preferred aerosol-formers are glycerine and propylene glycol.

The slurry may have an aerosol-former content of greater than about 5 percent on a dry weight basis. The slurry may have an aerosol former content of between about 5 percent and about 30 percent by weight on a dry weight basis. More preferably, the aerosol-former is comprised between about 10 percent to about 25 percent of dry weight of the slurry. More preferably, the aerosol-former is comprised between about 15 percent to about 25 percent of dry weight of the slurry.

The binder and the cellulose fibres are preferably included in a weight ratio comprised between about 1:7 and about 5:1. More preferably, the binder and the cellulose fibres are included in a weight ratio comprised between about 1:1 and about 3:1.

The binder and the aerosol-former are preferably included in a weight ratio comprised between about 1:30 and about 1:1. More preferably, the binder and the aerosol-former are included in a weight ratio comprised between about 1:20 and about 1:4.

Preferably, the alkaloid containing material is tobacco. The binder and the tobacco particles are preferably included in a weight ratio comprised between about 1:100 and about 1:10. More preferably, the binder and the tobacco particles are included in a weight ratio comprised between about 1:50 and about 1:15, even more preferably between about 1:30 and 1:20.

The aerosol-former and the tobacco particles are preferably included in a weight ratio comprised between about 1:20 and about 1:1. More preferably, the aerosol-former and the tobacco particles are included in a weight ratio comprised between about 1:6 and about 1:2.

The aerosol former and the cellulose fibres are preferably included in a weight ratio comprised between about 1:1 and about 30:1. More preferably, the aerosol-former and the cellulose fibres are included in a weight ratio comprised between about 5:1 and about 15:1.

The cellulose fibres and the tobacco particles are preferably included in a weight ratio comprised between about 1:100 and about 1:10. More preferably, the cellulose fibres and the tobacco particles are preferably included in a weight ratio comprised between about 1:50 and about 1:20.

The slurry is formed in a given location and then it is stored. The slurry can be for example stored and formed in the same location, for example in the same tank, or in two different locations, for example in two different tanks. The tank used are preferably known in the field. Further, the slurry can be formed or stored in a single tank, or in a plurality of tanks. In the following, the tank where the slurry is stored and possibly also formed is called first tank. If more than one tank is used, they will be referred to as second tank, third tank and so on.

From the tank where it is stored, the slurry is transferred to a casting box in order for a cast sheet of a material containing alkaloids to be formed. The cast sheet may be formed onto a movable support, which is moved along a casting direction so that a continuous sheet, or web, of material containing alkaloids, is obtained.

The casting is performed using any known casting device, for example the slurry may be cast using a casting blade. The slurry may be extruded onto the movable support. The slurry may be sprayed onto the movable support. The slurry may be smeared onto the movable support. The casting device is preferably connected to the casting box.

The casting-box is preferably box-shaped. Preferably, the casting box includes walls. More preferably, the walls in turn comprise sidewalls. The sidewalls may include a first and a second couple of opposite walls, called first, second, third and fourth sidewall. The sidewalls are advantageously substantially vertical, or tilted with respect to a vertical plane. The sidewalls may be curved. First and second sidewalls, and third and fourth sidewalls, are one facing the other. Preferably, the walls of the casting box also include a bottom wall which has an aperture. Preferably, the whole bottom wall defines an aperture. The casting box may include a lid so that it forms a pressurized chamber. The inner pressure of the pressurized chamber may be regulated. In some embodiments, the casting box is open at the top.

The transfer of the slurry from the first tank to the casting box is performed via a flow-path, for example via suitable piping, so that the first tank and the casting box are fluidly connected to allow the slurry to be transferred from first tank to the casting box. Preferably, the slurry is continuously supplied from the first tank to the casting box for at least the most part of production time during which the slurry is cast onto the movable support.

The amount of slurry in the casting box is preferably kept substantially constant. For example, the amount of slurry in the casting box is equal to a pre-defined quantity. Preferably, the pre-defined quantity of amount of slurry in the casting box is constantly maintained. For example, a pre-determined level of slurry within the casting box is set. In order to obtain a substantially constant level of slurry in the casting box, slurry is continuously supplied to the casting box while the slurry is cast onto the movable support.

The flow-path from the tank to the casting box includes a first flow-path and a second flow-path. Each of the first flow-path and the second flow-path connects the tank to the casting box. The first flow-path and the second flow-path may be completely separated. For example each of the first flow-path and the second flow-path may include a separate outlet in the tank, a separate inlet in the casting box, a separate duct between inlet and outlet. Alternatively, the first flow-path and second flow-path may have a common section. For example, there can be a single outlet in the tank (for example a single aperture), a single common duct for a given length extending from the outlet, which then bifurcates in two different paths which lead to two different inlets into the casting box. Conversely, two distinct outlets can be present in the first tank from which two different ducts extend, which then merge in a single duct ending in a single inlet at the casting box. Further, a single outlet and a single inlet can be present, with a first common duct departing from the outlet, which then braches in two and merge again in a single second common duct which ends at the inlet. Therefore, a first flow-path and a second flow-path indicate two flow-paths from the first tank to the casting box that are for at least a portion distinct one from the other, but they may have common portions or sections as well. The first flow-path then directs the slurry from the first tank to the casting box along a first route and the second flow-path directs the slurry from the first tank to the casting box along a second route that is at least in part different from the first route.

The first flow-path includes a first pump and the second flow-path includes a second pump. The first pump and second pump are located in those portions of the first flow-path and second flow-path that are not in common, that is, the first pump pumps the slurry to the casting box only if the slurry is directed to the casting box via the first flow-path and the second pump pumps the slurry only if the slurry flows to the casting box via the second flow-path. Only one or both pumps may be submerged in the slurry they are pumping, or may be placed external to the slurry. According to the invention, the first pump is a different pump from the second pump. Preferably, at least a characteristic of the first pump is different from a characteristic of the second pump. For example, the first pump could belong to a pump type different from the second pump type. The second pump may have a maximum absorbed power higher than the first pump.

In case more than a tank for the slurry storage is present, further flow-paths can be present, leading the slurry from the various tanks to the casting box using different pumps. Alternatively or in addition, also when a single tank is present, more than two different flow-paths can be provided, each of which has a different pump.

Further, if several tanks are present, a flow-path connecting one tank to the casting box and another flow-path connecting another tank to the casting box may have a pump in common. As long as a first tank is present having a first flow-path comprising a first pump and a second flow-path comprising a second pump, the first pump and second pump may be shared with other flow-paths connecting other tanks to the casting box. For example, a second tank is provided including a third flow-path and a fourth flow-path, both flow-paths connecting the second tank with the casting box. The third flow-path may share the first pump with the first flow-path, that is, the first flow-path and third flow-path have a section in common, and the fourth flow-path may share the second pump with the second flow-path, that is, the second flow-path and fourth flow-path have a section in common.

The slurry, in order to reach the casting box, in a given time interval, flows either through the first or through the second flow-path, but not through both at the same time. Alternatively, if there are common portions between the two flow-paths, the slurry in all cases flows through these common portions. Therefore, the slurry is directed either in the first or in the second flow-path, for example by means of the actuation of a valve or more multiple valves that open or close either the first or the second flow-path.

In case the slurry flows through the first flow-path, it is moved by the first pump. In case the slurry flows through the second flow-path, it is moved by the second pump.

The selection between the first flow-path or the second flow-path is performed on the basis of a viscosity value of the slurry. The viscosity of a fluid is a measure of its resistance to deformation at a given rate. There are two related measures of viscosity, which are called dynamic viscosity and kinematic viscosity. The dynamic viscosity is a measure of internal resistance. Dynamic viscosity is the tangential force per unit area required to move one horizontal plane with respect to another plane—at an unit velocity—when maintaining an unit distance apart in the fluid.

In the International System of Units (SI system) the dynamic viscosity units are N (Newton) s/m$^2$, Pa (Pascal) s or kg/(m s). Dynamic viscosity may also be expressed in the metric CGS (centimetre-gram-second) system as g/(cm*s), dyne s/cm$^2$ or Poise (P). For practical use the Poise is normally too large and the unit is therefore often divided by 100—into the smaller unit centipoise (cP)—where 1 P=100 cP (centiPoise).

Kinematic viscosity is the ratio of dynamic viscosity to density, a quantity in which no force is involved. Kinematic viscosity can be obtained by dividing the dynamic viscosity of a fluid with the fluid mass density like $$v=\mu/\rho$$

where v=kinematic viscosity (m$^2$/s)

μ=dynamic viscosity (N s/m$^2$)

ρ=density (kg/m$^3$)

In the SI system the theoretical unit of kinematic viscosity is m$^2$/s—or the commonly used Stoke (St) where 1 St (Stokes)=$10^{-4}$ m$^2$/s=1 cm$^2$/s.

The viscosity of the slurry to be considered can be either the dynamic viscosity or the kinematic viscosity. Preferably, the considered viscosity is the dynamic viscosity.

For example, the slurry may have a dynamic viscosity in the range of from about 15000 centiPoise to about 45000 centiPoise. The viscosity value of the slurry depends on the composition of the slurry: for example the higher the water content is in the slurry, the lower the viscosity of the slurry. The higher the tobacco content is in the slurry, the higher the viscosity of the slurry. Further, the viscosity of the slurry depends on its temperature and pressure. Further, it depends on the homogeneity of the slurry.

Preferably, the viscosity of the slurry is evaluated using a viscosity evaluator. The viscosity evaluator may include a viscosimeter. The viscosimeter measures the viscosity of the slurry. Preferred viscosimeters are the rotational or the vibrational viscosimeters. The values above indicated as range of viscosity value for the slurry have been measured with the viscosimeter Proline Promass I 100 Coriolis flowmeter produced by Endress and Hauser AG.

On the basis of the viscosity value of the slurry, the slurry is directed either along the first flow-path or along the second flow-path. Indeed, preferably, the first flow-path and the second flow-path, and more preferably the first pump and the second pump, are suitable for a given range of viscosity of the slurry. Preferably, for a given viscosity value, one of the first flow-path and the second flow-path is better adapted for that given viscosity value. For example, the first pump and second pump are optimized for different viscosity ranges. For example, the first pump might be adapted to function with "low viscosity" fluids and the second pump might be adapted to function with "high viscosity" fluids. For example, the first pump may be suitable for a first range of viscosities and the second pump may be suitable for a second range of viscosities. Preferably, the first range is different from the second range. Preferably, the first range includes viscosities comprised between about 15000 centiPoise and about 25000 centiPoise. Preferably, the second range includes viscosities comprised between about 20000 centiPoise and about 45000 centiPoise. Further, other characteristics of the first flow-path may differ from those of the second flow-path. For example, different duct or piping could be used, having for example different diameters or may be formed in different material. Different valves can be used as well.

For certain values of viscosity of the slurry, both the first flow-path and the second flow-path may obtain optimal results in delivery of the slurry. In this case, either the flow-path is chosen randomly between the first flow-path and the second flow-path, or an implemented logic makes the choice, for example on the basis of other factors.

Therefore, if a given slurry batch prepared and stored in the first tank has a first viscosity value, the first flow-path might be chosen. If the next batch of slurry has a second viscosity value, different from the first, for example higher than the first, the slurry may be directed along the second flow-path. The switching may be performed manually, for example manually operating the valve(s) opening and closing the first flow-path or the second flow-path, or automatically, through suitable actuators or control elements.

Further, the viscosity of the slurry may be measured only once, and thus the selection of the flow-path is made for the whole casting process. In other embodiments, the viscosity of the slurry may be measured multiple times or continuously, so that switching from one flow-path to the other can be performed during casting as well.

Choosing the most suitable flow-path between the first flow-path and the second flow-path depending on the density value of the slurry, may allow to obtain a substantially constant flow rate of the slurry in the casting box, independent of the viscosity of the slurry. Due to the fact that the pump suitable for that viscosity is chosen, the required flow rate can be achieved. The casting is therefore improved. According to the invention, machine stops may avoided. Also, the variation of thickness of the cast sheet may be reduced compared to systems without two different pumps. The pressure in the casting box may be easily controlled. The control of all these parameters may improve homogeneity of the cast sheet.

Further, damages to the first pump and the second pump is minimized because the suitable pump for the viscosity value of the slurry is advantageously selected. Costs can be reduced, because more economical pumps for a specific viscosity range can be used, compared to pumps that could cover broader viscosity ranges. Further, the ducts included in the first flow-path and second flow-path may be different as well. Different, adapted ducts may reduce costs and wear and tear of the material of the ducts. For example, may be only certain production runs require a higher temperature, or higher temperature preservation over the slurry, requiring in turn relatively expensive and specialised piping and pumps. These piping and pump may be present only in the first flow-path. Then, the second pump and duct system could be used for the simpler production runs.

Preferably, the step of directing the slurry either along the first flow-path or along the second flow-path from the first tank to the casting box on the basis of the viscosity value of the slurry includes: setting a threshold viscosity value; directing the slurry through the first flow-path if the viscosity value of the slurry is below the threshold viscosity value; and directing the slurry through the second flow-path otherwise. Preferably, the first flow-path is preferred for "low viscosity slurry" and the second flow-path is preferred for "high viscosity slurry". A threshold value of viscosity is thus selected which determines whether the slurry is directed through the first flow-path or the second flow-path. An example of the threshold value for the viscosity may be about 23000 centiPoise.

Preferably, the viscosity of the slurry is measured or determined. More preferably, the slurry has a composition, and the method comprises one or more of: measuring the viscosity value of the slurry in the tank; measuring the viscosity value of the slurry in the casting box; measuring the viscosity value of the slurry in the first or second flow-path; determining the viscosity value on the basis of the slurry's composition. The viscosity value of the slurry may be evaluated in different ways and locations. For example, the viscosity value may be measured by means of a viscosimeter. Preferably, the viscosimeter can be placed in the first tank so that the viscosity is measured in the first tank. Alternatively or in addition, the viscosity of the slurry may be measured in the first flow-path or in the second flow-path, for example in ducts or piping part of the first flow-path or second flow-path. Further, the viscosity value may be measured in the casting box, for example at the inlet of the first flow-path or second flow-path. The viscosity value may also be derived by other measurements, for example it may be calculated knowing the slurry's composition. The viscosity may also be determined by comparison with historical data.

According to some embodiments, the selection of the flow-path in which to direct the slurry, that is, whether the first flow-path or the second flow-path is to be chosen, is taken at different possible moments. The selection can be made in advance, that is, before starting the casting process, for example on the basis of a slurry batch composition. From the composition of the slurry, the slurry viscosity can be calculated and it can be determined whether it belongs to the ranges of viscosities for which the first flow-path is preferred, or to the range of viscosities for which the second flow-path is preferred. Alternatively or in addition, the selection can be made real-time, based on a measured pump speed of the pump used (of the pump belonging to the selected flow-path in which the slurry is directed in that specific instant) and the corresponding flow rate of the slurry. For a given pump speed, a given slurry flow rate is expected. If the measured flow rate differs from the expected one, a change in flow-path may be decided. Alternatively or in addition, the selection can be made real-time, based on viscosity measurement of the slurry. The measurements may be performed inline. Further, the measurements may be performed in the tank or in the first flow-path or in the second flow-path or in the casting box. The measurements may be performed for instance with a viscometer evaluating the kinematic viscosity (or dynamic viscosity of the slurry when the density of the slurry is known). Examples of suitable viscosimeters are for instance a vibrating viscometer, a capillary viscometer, a Zahn cup or others. If the viscosity of the slurry changes, the selected flow-path may change as well.

More preferably, the method comprises measuring or determining the viscosity value of the slurry more than once; and switching the flow of slurry from the first flow-path to the second flow-path, or vice-versa, in case of a variation of the viscosity value compared to the previous measurement or determination. Preferably, a feedback loop is present. The viscosity value is measured several times, for example with a given frequency. On the basis of the result of the measurements, or if these variations are confirmed in more than one measurements, then the slurry is directed to a different flow-path than the flow-path in which the slurry was directed before. On the basis of the result of the measurements may mean for example if variations in the viscosity value are present, and more preferably if viscosity value's variations above a given threshold are present. The composition of the slurry or the slurry type might change during production and therefore also the selected flow-path may change accordingly.

The composition of the slurry or the slurry type might change during production and therefore also the selected flow-path may change accordingly, monitoring the value of the viscosity of the slurry.

Preferably, the method comprises: storing the slurry in a second tank; providing a third flow-path for fluid communication between the second tank and the casting box, the third flow-path comprising a third pump; connecting the second flow-path to the second tank, so that the second tank and the casting box are in fluid communication via the second flow-path; directing the slurry either through the third flow-path or through the second flow-path from the second tank to the casting box on the basis of the viscosity value of the slurry. As mentioned, the slurry may be stored in more than one tank, for example in a first tank and in a second tank. Each thank therefore has a flow-path to the casting box, the first flow-path including the first pump and connecting the first tank to the casting box and the third flow-path including the third pump and connecting the second tank to the casting box. Preferably, the first pump and the third pump have substantially similar characteristics. Preferably, the first pump and the third pump are adapted to be used with slurry having substantially the same viscosity values. The first tank and second thank further share the second flow-path, to be used to direct the slurry from the first tank and the second tank to the casting box. In the second tank, the slurry is directed either through the third flow-path or through the second flow-path depending on the value of the viscosity of the slurry. Additionally, each tank may be also fluidly connected to more than one casting box.

Preferably, the slurry is directed through the first flow-path and third flow-path from the first tank and second tank to the casting box for the same ranges of values of the slurry viscosity. Preferably, the slurry is directed through the second flow-path, instead of the first flow-path and third flow-paths, from the first tank and the second tank to the casting box for the same values of the slurry viscosity.

More preferably, the method comprises: measuring or determining the viscosity value of the slurry more than once; switching both flows of slurry from the first flow-path and third flow-path to the second flow-path, or vice-versa, in case of a variation of the viscosity value compared to the previous measurement or determination. Preferably, a feedback loop is present. The viscosity value is measured several times, for example with a given frequency. On the basis of the result of the measurements, or if these variations are confirmed in more than one measurements, then the slurry is directed to a different flow-path than the flow-path in which the slurry was directed before. On the basis of the result of the measurements may mean for example if variations in the viscosity value are present, and more preferably if viscosity value's variations above a given threshold are present. The composition of the slurry or the slurry type might change during production and therefore also the selected flow-path may change accordingly.

Preferably, the flow of slurry entering in the casting box defines a flow-rate, and the method comprises: maintaining the flow rate of the slurry entering in the casting box substantially constant before and after the switching. The flow rate for example can be measured at the inlet of the flow-path at the casting box.

Preferably the first pump defines a first pump speed and the second pump defines a second pump speed. Preferably, the method comprises: measuring the first pump speed or the second pump speed; measuring a flow rate of the slurry in the first flow-path or in the second flow-path; and switching the flow of slurry from the first flow-path to the second flow-path, or vice-versa, in case the measured flow rate of the slurry in the first flow-path or in the second flow-path is outside a given range for the respective measured first pump speed or second pump speed. In case for example also a third flow-path having a third pump is present, preferably, the first pump defines a first pump speed, the second pump defines a second pump speed and the third pump defines a third pump speed. The method comprises preferably: measuring the first pump speed, the second pump speed and the third pump speed; measuring a flow rate of the slurry in the first flow-path or second flow-path or third flow-path; switching both flows of slurry from the first flow-path or third flow-path to the second flow-path, or vice-versa, in case the measured flow rate is outside a given range for the respective measured first pump speed, second pump speed or third pump speed.

The first pump speed of the first pump is measured. The second pump speed of the second pump is measured. The third pump speed of the third pump, if present, is measured. The flow rate of the slurry in the first flow-path is measured. The flow-rate in the second flow-path is measured. The flow-rate in the third flow-path, if present, is measured. If the flow rate in the first flow-path is outside a given range for the measured first pump speed, the flow of slurry is switched from the first flow-path to the second flow-path. If the flow rate in the third flow-path is outside a given range for the measured third pump speed, the flow of slurry is switched from the third flow-path to the second flow-path. If the flow rate in the second flow-path is outside a given range for the measured second pump speed, the flow of slurry is switched from the second flow-path to the first flow-path or third flow-path.

The speed of a pump refers to its rotational speed. Pumps generally comprise a rotary mechanism to move the slurry. The pump speed therefore refers to the rotational speed, or number of revolution per unit time, of the pump. Different pumps may have different maximum speeds, above which the pump might malfunction or overheat. The pump may also be limited to a maximum speed and cannot increase its speed above the maximum speed, for example for safety reasons. Therefore, if the speed of the pump is outside a given range, the slurry is directed to a different flow-path than the flow-path used to reach the casting box at the moment of the speed measurement. When a pump speed outside the given range for the pump speed has been measured, this may mean that the slurry is too viscous for that given pump present in the flow-path. In such a case a different pump, and in turn a different flow-path, is preferably to be used. Preferably, the speed of the pump has a given range, which is pump-dependent. For example, this given range may include the maximum speed of the first pump, the maximum speed of the second pump and the maximum speed of the third pump: This may advantageously prevent the pump from reaching the maximum speed of a given pump.

Preferably, the first pump defines a first pump speed and the second pump defines a second pump speed. Preferably, the method comprises: measuring a flow rate of the slurry exiting the casting box or entering the casting box or in the first flow-path or in the second flow-path; and changing the first pump speed or second pump speed on the basis of the measured slurry flow rate.

For example, if a third pump is present, preferably the first pump, the second pump or the third pump defines the first pump speed, the second pump speed or the third pump speed, the method comprises: measuring a flow rate of the slurry exiting the casting box or entering the casting box or in the first flow-path, or in the second flow-path or in the third flow-path; and changing the first pump speed or second pump speed or third pump speed on the basis of the measured slurry flow rate.

If the flow rate of the slurry changes, a pump speed change may be required as well to bring the flow rate back to the desired value.

Preferably, the first pump or second pump is a positive displacement pump. Preferably, the second pump includes a positive displacement pump in the second flow-path where more "viscous slurries" are directed. Preferably, the second pump can be used with slurries having a dynamic viscosity range comprised between about 20000 centiPoise and about 45000 centiPoise. Preferably, the first pump can be used with slurries having a dynamic viscosity range comprised between about 15000 centiPoise and about 25000 centiPoise. Preferably, the first pump or the second pump includes a lobe pump. More preferably, the first pump or the second pump includes a volumetric flow pump.

Preferably, the first flow-path or the second flow-path includes piping, the piping having a diameter comprised between about 2.5 centimetres and about 10.5 centimetres. Preferably, the first flow-path or second flow-path includes piping to direct the slurry from the first tank to the casting box.

Preferably, the piping is made from metal, more preferably the piping is made from stainless steel. The diameter of the piping is preferably selected depending on the slurry viscosity and expected flow rate.

Preferably, the viscosity evaluator includes a viscosimeter. Preferably, the viscosimeter evaluates the kinematic viscosity. Alternatively, the viscosimeter evaluates the dynamic viscosity of the slurry when the density of the slurry is known. Preferably, the viscosimeter is a vibrating viscometer, a capillary viscometer, a Zahn cup or others.

Preferably, the apparatus comprises: a second tank; a third flow-path fluidly connecting the second tank to the casting box to direct a flow of slurry to the casting box; a third pump located within the third flow-path; wherein the second flow-path fluidly connects the second tank and the casting box to direct a flow of slurry to the casting box; a second valve to selectively open either the third flow-path or second flow-path to allow the flow of slurry from the second tank to the casting box either via the third flow-path or via the second flow-path; wherein the control element operates the second valve to select the third flow-path or second flow-path on the basis of the viscosity value of the slurry. As mentioned, the slurry may be stored in more than one tank, for example a first tank and a second tank. Each thank has preferably its own flow-path to the casting box, the first flow-path including the first pump connecting the first tank to the casting box and the third flow-path including a third pump connecting the second tank to the casting box. Preferably, the first pump and the third pump have substantially similar characteristics. Preferably, the first pump and the third pump are adapted to be used with slurry having substantially the same viscosity values. The first tank and the second thank also preferably share the second flow-path, wherein the second flow-path is to be used to direct the slurry from the first tank and the second tank to the casting box. In the second tank the slurry is directed either through the third flow-path or through the second flow-path depending on the value of the viscosity of the slurry. Thus depending on the value of the viscosity of the slurry, a valve is opened or closed in order to direct the slurry via the third flow-path or the second flow-path.

Preferably, the first pump, second pump or third pump defines a first pump speed, a second pump speed or a third pump speed respectively. Preferably, the apparatus comprises a speed variator to vary the first pump speed, or second pump speed or third pump speed respectively. In order to have a substantially constant flow rate, the speed of the pump may be changed.

Specific embodiments will be further described, by way of example only, with reference to the accompanying drawings in which.

Figure 1:
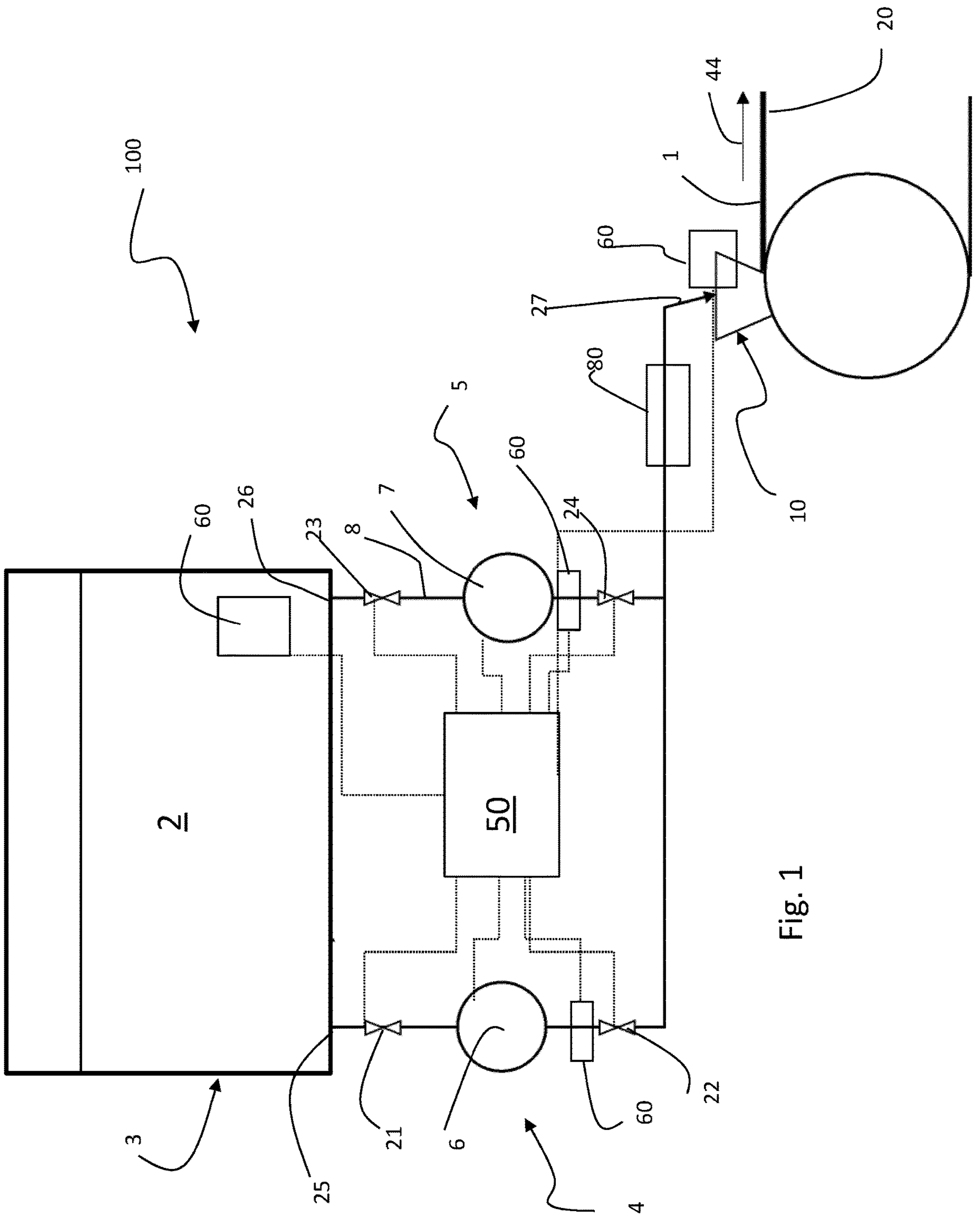
FIG. 1 shows a schematic lateral view of a casting apparatus for casting a sheet of a material containing alkaloids according to the invention.

With reference to FIG. 1, a first embodiment of a casting apparatus for the production of a cast sheet of a material containing alkaloids according to the present invention is represented and indicated with reference number 100. Only a portion of the casting apparatus 100 is shown in FIG. 1.

In particular, the casting apparatus 100 is adapted for the production of a cast sheet of a material containing alkaloids, such as a homogenized tobacco material 1.

The casting apparatus 100 comprises a casting box 10 containing slurry 2 and a movable support 20, wherein a casting blade 70 (see FIG. 4) casts the slurry 2 contained in the casting box 10 onto the movable support 20 so as to form the cast sheet 1 of homogenized tobacco material. Instead of casting blade 70, any other casting device can be used as well. The casting apparatus 100 further includes a first tank 3, such as a storage or a buffer tank, from where slurry 2 is transferred into the casting box 10. Casting apparatus 100 includes a first flow-path 4 and a second flow-path 5 connecting casting box 10 to first tank 3, and a first pump 6 and a second pump 7, positioned respectively within the first flow-path 4 and second flow-path 5. Preferably, the first pump 6 and the second pump 7 comprise a control of flow rate to control the amount of slurry 2 introduced in the casting box 10 via the first flow-path or the second flow-path. The first pump 6 and second pump 7 are advantageously designed to ensure that slurry transfer times are kept to the minimum necessary. The first tank 3 is thus fluidly connected, by means of the first flow-path 4 and second flow-path 5, to the casting box 10 so as to feed the same with the slurry 2.

First pump 6 is different from second pump 7. First pump is suitable to work with a first range of slurry viscosities. Second pump is suitable to work with a second range of slurry viscosities. The first range is different from the second range.

Each flow-path 4, 5 includes suitable piping 8 and two valves, positioned downstream and upstream their respective first and second pump 6, 7. First valve 21 and second valve 22 are present in the first flow-path 4 upstream and downstream the first pump 6, respectively, and third valve 23 and fourth valve 24 are present in the second flow-path 5, upstream and downstream the second pump 7, respectively. First valve 21 and second valve 22 are used in order to enable the replacement of the first pump 6 from the first flow-path 4 for cleaning or maintenance. Third valve 23 and fourth valve 24 are used in order to enable the replacement of the second pump 7 from the second flow-path 5 for cleaning or maintenance.

In the embodiment of FIG. 1, first flow-path 4 includes a first outlet 25 formed in the first tank 3 and it extends from the same, while the second flow-path 5 includes a second outlet 26 formed in the first tank 3 and it extends from the same. Thus, for a given section of the first flow-path and a given section of the second flow-path, which includes the first pump and the second pump, the first flow-path is separate from the second flow-path.

Downstream the first pump 6 and second pump 7, the first flow-path 4 and second flow-path 5 merge so that a single inlet 27 delivers slurry to the casting box 10.

Further, the casting apparatus 100 includes a control element 50, apt to control the opening and closing of from the first valve to the fourth valve 21, 22, 23, 24. Control element 50 can be a control unit such as a microprocessor or the like, suitably programmed.

The casting apparatus 100 may also include one or more viscosimeter, all indicated with 60. The viscosimeter may be located in the first flow-path, or in the second flow-path, or in both. The viscosimeter 60 may be located alternatively or in addition in the first tank 3 or in the casting box 10, in order to measure or to determine the viscosity of the slurry. The viscosimeter 60, regardless of its position, is also connected to the control element 50. Control element 50 is also adapted to control first pump 6 and second pump 7 to control a characteristic of the same, for example their pump speed or pump flow rate.

The casting apparatus 100 also includes a flow rate sensor 80, depicted for example positioned in one of the first flow-path 4 or second flow-path 5. The flow-rate sensor 80 may be placed along one of the flow-paths 4, 5 or at the casting box 10. Flow rate sensor 80 is also connected to control element 50.

Figure 2:
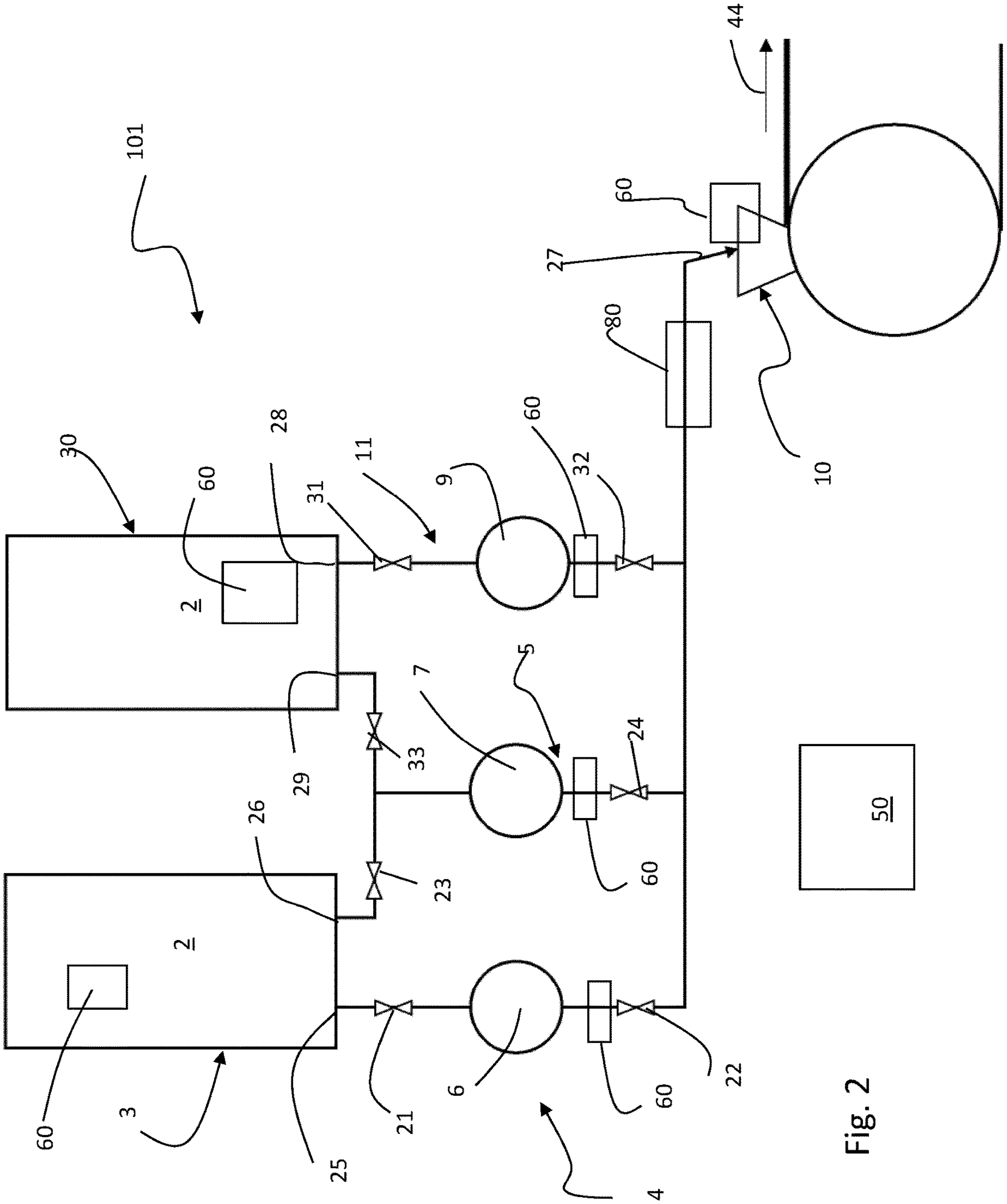
FIG. 2 shows a second embodiment of the casting apparatus of FIG. 1.

With now reference to FIG. 2, a second embodiment of the casting apparatus 101 is shown. Reference numerals indicating the same or analogue elements of the casting apparatus 100 of the embodiment of FIG. 1 remain unchanged.

The casting apparatus 101 includes a first tank 3 and a second tank 30. The first tank 3 and second tank 30 may be identical or different. Preferably, first tank 3 and second tank 30 are identical to first tank 3 of the first embodiment of the casting apparatus 100 of FIG. 1.

The casting apparatus 101 further comprises a casting box 10 identical to that of the first embodiment of the casting apparatus 100 and detailed later with reference to FIG. 4.

The casting apparatus 101 further includes a first flow-path 4, a second flow-path 5, and a third flow-path 11 to connect casting box 10 to first tank 3 and second tank 30: first flow-path 4 connects the first tank 3 to the casting box 10, the third flow-path 11 connects the second tank 30 to the casting box 10, while the second flow-path 5 connects both first tank 3 and second tank 30 to the casting box 10. Each of first flow-path 4, second flow-path 5 and third flow-path 11 includes a pump, namely, first pump 6, second pump 7 and third pump 9, respectively. Preferably, each of the first pump 6, second pump 7 and third pump 9 comprises a control of flow rate to control the amount of slurry 2 introduced in the casting box 10. The first pump 6, second pump 7 and third pump 9 are advantageously designed to ensure that slurry transfer times are kept to the minimum necessary. The first tank 3 is thus fluidly connected, by means of the first flow-path 4 and second flow-path 5, to the casting box 10 so as to feed the same with the slurry 2. The second tank 30 is thus fluidly connected, by means of the second flow-path 5 and third flow-path 11, to the casting box 10 so as to feed the same with the slurry 2.

First pump 6 is different from second pump 7. First pump is suitable to work with a first range of slurry viscosities. Second pump is suitable to work with a second range of slurry viscosities. The first range is different from the second range. Third pump 9 is substantially identical to first pump 6. Third pump 9 is suitable to work with a third range of slurry viscosities. The third range is equal to the first range.

First flow-path 4 and third flow-path 11 are similar to each other. Each of the first flow-path and third flow-path includes two valves, positioned downstream and upstream their respective first pump 6 and third pump 9. First valve 21 and second valve 22 are present in the first flow-path 4 upstream and downstream the first pump 6, respectively. Fifth valve 31 and sixth valve 32 are present in the third flow-path 11 upstream and downstream the third pump 9, respectively. First valve 21 and second valve 22 are used in order to enable the replacement of the first pump 6 from the first flow-path 4 for cleaning or maintenance. Fifth valve 31 and sixth valve 32 are used in order to enable the replacement of the third pump 9 from the third flow-path 11 for cleaning or maintenance.

In the embodiment of FIG. 2, each of the first flow-path 4 and third flow-path 11 includes an outlet. First flow-path 4 includes an outlet 25 in the first tank 3 and it extends from the outlet. Third flow-path 11 includes an outlet 28 in the second tank 30. Thus, for a given section of the first flow-path and for a given section of the third flow-path, which includes the first pump 6 and the third pump 9, respectively, the first flow-path is separate from the third flow-path. Downstream the first pump 6 and third pump 9, the first flow-path 4 and third flow-path 11 merge so that a single inlet 27 delivers slurry to the casting box 10.

The second flow-path includes two outlets, one outlet 26 in the first tank 3 and another outlet 29 in the second tank 30. From the two outlets 26, 29, two separate piping 8 extend and they merge upstream the second pump 7. In each piping, a valve is included, seventh valve 33 and third valve 23, located upstream the second pump 7. Downstream the second pump 7, a further valve, fourth valve 24, is positioned. Downstream fourth valve 24, the second flow-path 5 merges with the first flow-path 4 and third flow-path 11 so that a single inlet 27 delivers slurry 2 to the casting box 10. Third valve 23 and seventh valve 33 upstream of second pump 7, and fourth valve 24 downstream second pump 7 are used in order to enable the replacement of the second pump 7 from the second flow-path 5 for cleaning or maintenance.

Further, the casting apparatus 101 includes control element 50, apt to control the opening and closing of from the first to the seventh valves 21, 22, 23, 24, 31, 32, 33. Control element 50 can be a control unit such as a microprocessor or the like suitably programmed. In FIG. 2, the connection of control element 50 with the various components is not indicated for clarity purposes.

The casting apparatus 101 may also include one or more viscosimeters, all indicated with 60. The viscosimeter may be located in the first flow-path or in the second flow-path or in the third flow-path. The viscosimeter may be located in all flow-paths. The viscosimeter may be located in two of the three flow-paths. In addition or alternatively, the viscosimeter may be located in the first tank 3, in the second tank 30, or in the casting box 10, in order to measure or to determine the viscosity of the slurry. The viscosimeter 60, regardless of its position, is also connected to the control element 50.

Control element 50 is also adapted to control first pump 6, second pump 7 and third pump 9 to control a characteristic of the same, for example their speed or pump flow rate.

The casting apparatus 101 also includes a flow rate sensor 80, depicted for example positioned in one of the flow-paths. The flow rate sensor 80 may be placed along one of the first flow-path 4, second flow-path 5, or third flow-path 11. The flow rate sensor may be located in all flow-paths. The flow rate sensor may be located in two of the three flow-paths. The flow rate sensor 80 may be located at the casting box 10 so that the flow rate of the slurry at the inlet 27 is measured. Flow rate sensor 80 is also connected to control element 50.

Figure 3:
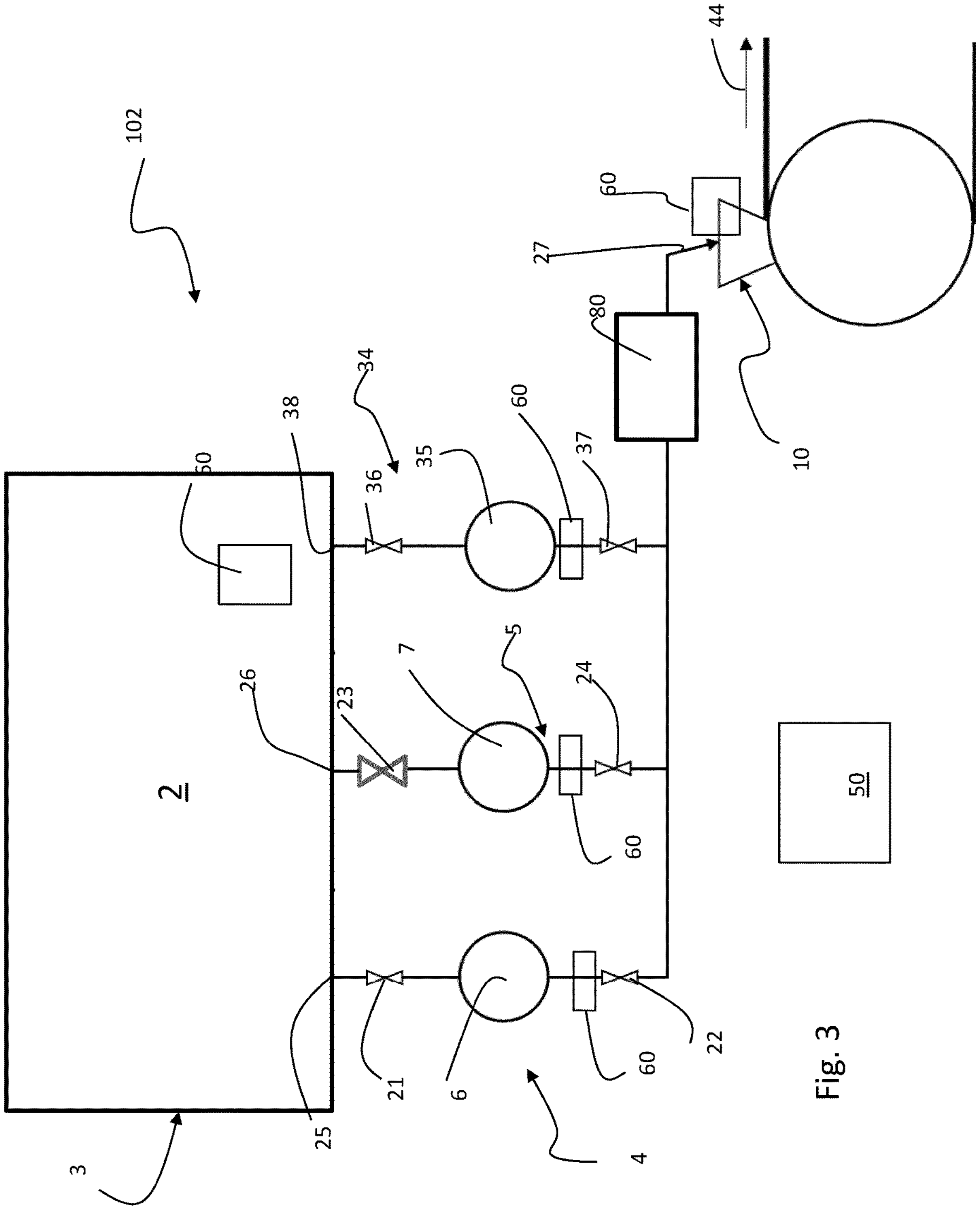
FIG. 3 shows a third embodiment of the apparatus of FIGS. 1 and 2.

With now reference to FIG. 3, a third embodiment of the casting apparatus 102 is shown. Reference numerals indicating the same or analogue elements of the casting apparatuses 100, 101 of embodiments of FIG. 1 or 2 remains unchanged.

The casting apparatus 102 is similar to the casting apparatus 100 of FIG. 1. The casting apparatus 102 comprises a casting box 10 identical to that of the first embodiment and second embodiment of the casting apparatus 100, 101 and detailed later with reference to FIG. 4.

The casting apparatus 102 differs from the casting apparatus 100 of FIG. 1 in that it includes an additional flow-path to the first flow-path and the second flow-path. The additional flow-path connects the first tank 3 to the casting box 10, as the first flow-path and second flow-paths. Casting apparatus 102 includes a first flow-path 4, a second flow-path 5, and a fourth flow-path 34 to connect casting box 10 to first tank 3. Each of the first flow-path, second flow-path and fourth flow-paths includes a pump, namely, first pump 6, second pump 7 and fourth pump 35. Preferably, the first pump 6, second pump 7 and fourth pump 35 comprise a control of flow rate to control the amount of slurry 2 introduced in the casting box 10. The first pump 6, second pump 7 and fourth pump 35 are advantageously designed to ensure that slurry transfer times are kept to the minimum necessary. The first tank 3 is thus fluidly connected, by means of the first flow-path 4, second flow-path 5 and fourth flow-path 34 to the casting box 10 so as to feed the same with the slurry.

First pump 6 is different from second pump 7. First pump is suitable to work with a first range of slurry viscosities. Second pump is suitable to work with a second range of slurry viscosities. The first range is different from the second range. Fourth pump 35 is different from first pump 6. Fourth pump 35 is different from second pump 7. Fourth pump 35 is suitable to work with a fourth range of slurry viscosities. The fourth range is different from the first range. The fourth range is different from the second range.

Each of the first flow-path 4, second flow-path 5 and fourth flow-path 34 includes two valves, positioned downstream and upstream their respective first pump 6, second pump 7 and fourth pump 35. First valve 21 and second valve 22 are present in the first flow-path, upstream and downstream the first pump 6, respectively. Third valve 23 and fourth valve 24 are present in the second flow-path, upstream and downstream the second pump 7, respectively. Eighth valve 36 and ninth valve 37 are present in the fourth flow-path 34, upstream and downstream the fourth pump 35, respectively. First valve 21 and second valve 22 are used in order to enable the replacement of the first pump 6 from the first flow-path 4 for cleaning or maintenance. Third valve 23 and fourth valve 24 are used in order to enable the replacement of the second pump 7 from the second flow-path 5 for cleaning or maintenance. Eighth valve 36 and ninth valve 37 are used in order to enable the replacement of the fourth pump 35 from the fourth flow-path 34 for cleaning or maintenance. In the embodiment of FIG. 3, each of the first flow-path 4, second flow-path 5 and fourth flow-path 34 includes an outlet 25, 26, 38 in the first tank 3, respectively, from which they extend. Downstream the first pump 6, second pump 7 and fourth pump 35, the first flow-path, second flow-path and fourth flow-path merge so that a single inlet 27 delivers slurry to the casting box 10.

Further, the casting apparatus 102 includes control element 50, apt to control the opening and closing of valves 21, 22, 23, 24, 36, 37. Control element 50 can be a control unit such as a microprocessor or the like suitably programmed. In FIG. 3, the connection of control element 50 with the various components is not indicated for clarity purposes.

The casting apparatus 102 may also include one or more viscosimeter, all indicated with 60. The viscosimeter may be located in the first flow-path or in the second flow-path or in the fourth flow-path. The viscosimeter may be located in all flow-paths. The viscosimeter may be located in two of the three flow-paths. In addition or alternatively, the viscosimeter may be located in the first tank 3, or in the casting box 10, in order to measure or to determine the viscosity of the slurry. The viscosimeter 60, regardless of its position, is also connected to the control element or unit 50.

Control element 50 is also adapted to control first pump 6, second pump 7 and fourth pump 35 to control a characteristic of the same, for example their speed or pump flow rate.

The casting apparatus 102 also includes a flow rate sensor 80, depicted for example positioned in one of the flow-paths. The flow rate sensor 80 may be placed along one of the first flow-path 4, second flow-path 5, or fourth flow-path 34. The flow rate sensor may be located in all flow-paths. The flow rate sensor may be located in two of the three flow-paths. The flow rate sensor 80 may be located at the casting box so that the flow rate at the outlet of one of the flow-paths is measured. Flow rate sensor 80 is also connected to control element 50.

Figure 4:
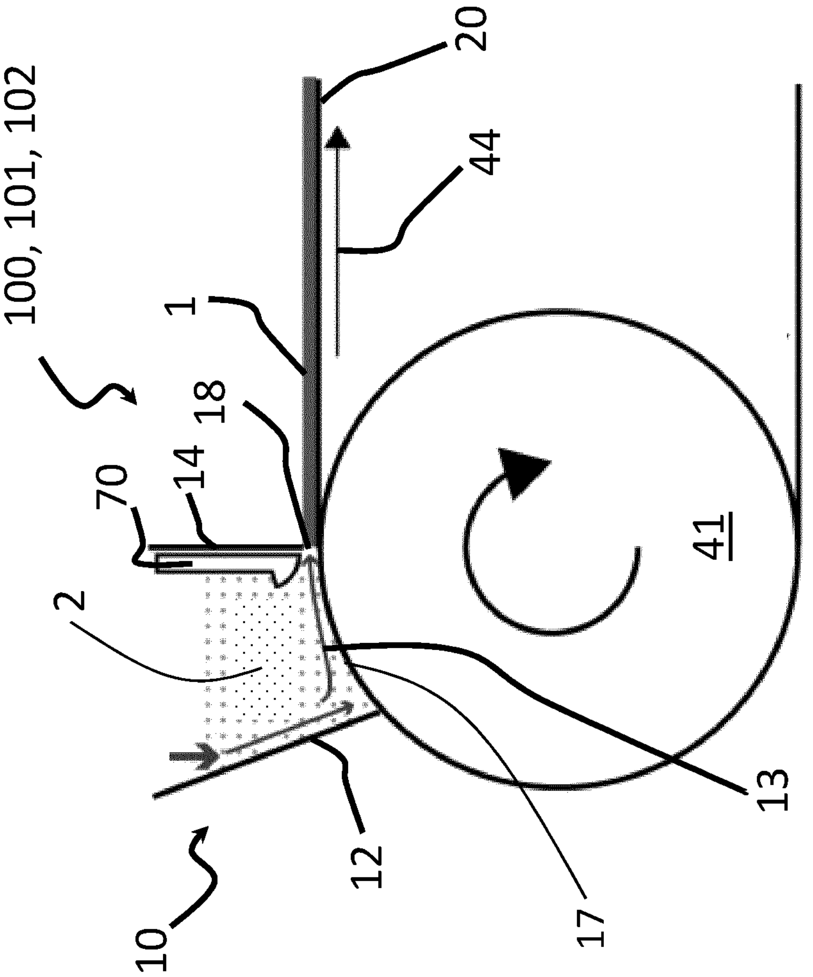
FIG. 4 shows an enlarged view of a detail of the apparatuses of FIGS. 1-3.

With now reference to FIG. 4, a detailed view of the casting box 10 is depicted. Casting box of FIG. 4 can be the casting box 10 used in any embodiment of the casting apparatus 100, 101, 102 of FIGS. 1-3.

The casting box 10 comprises four side walls. The side walls include first and second opposite walls 12, 14 and a third and a fourth opposite walls (not shown in the figures), which connect the first and second opposite walls 12, 14.

The casting blade 70 is associated to the casting box 10 at the second wall 14. The casting blade 70 is associated to the casting box 10 in order to cast the slurry. The casting blade 70 has a dominant dimension which is its longitudinal width. The casting blade 70 is for example substantially rectangular.

The casting blade 70 is attached to the casting box 10 preferably by means of an adjustable board operated by an actuator (not shown in the pictures) which allows a precise control of the position of the casting blade 70.

The amount of slurry 2 in the casting box 10 has a pre-determined level, which is preferably kept substantially constant so that the pressure exerted by the column of slurry 2 remains substantially the same. In order to keep the amount of slurry 2 substantially at the same level, the pumps (either first pump and second pump in the first embodiment of the casting apparatus 100, or the first pump, second pump and third pump in the second embodiment 101 of the casting apparatus, or the first pump, second pump and fourth pump in the third embodiment of the casting apparatus 102) control the flow of slurry 2 to the casting box 10.

The movable support 20 comprises for example a continuous stainless steel belt including a drum assembly. The drum assembly includes a main drum 41 located below the casting box 10 which moves the movable support 20. Preferably, the casting box 10 is mounted on top of the main drum 41.

The slurry 2 is cast on the steel belt 20—at the drum 41—through the casting blade 70, which creates a continuous sheet 1 of homogenized tobacco material. In order for the slurry 2 to reach the casting blade 70 and thus the movable support 20, the casting box 10 has an opening or aperture 17 in correspondence of its bottom and the opening 17 extends along a width of the casting box 10. The opening 17 is positioned over and in proximity of the drum 41.

The movement of the steel belt 20 forwards the slurry 2 towards the casting blade 70 at a front exit 18 of the casting box 10 (at the second wall 14; see curve 13 showing the slurry motion). The casting blade 70 casts a part of the slurry 2 on the steel belt 20, while the remaining majority of the slurry 2 turns back and recirculates inside the casting box 10. The steel belt 20 moves along a casting direction (see the arrow 44).

Between the casting blade 70 and the steel belt 20 a gap is present, the dimensions of which determine—among others—the thickness of the cast sheet 1 of homogenized tobacco material.

Casting apparatus 100 operates according to the method of the invention.

The viscosity of the slurry 2 is evaluated. The viscosity is preferably evaluated using viscosimeter 60 located in the first tank 3 or in the casting box 10 or in the first flow-path 4 or in the second flow-path 5, or in both. More than one viscosimeter can be used. Alternatively, the viscosity of the slurry can be calculated based on the slurry's composition.

The first flow-path 4 and second flow-path 5 are provided with two different pumps 6, 7 which are suitable for different type of viscosity of the slurry. For example the first pump 6 is preferably used for "low viscosity slurry" and the second pump 7 is preferably used for "high viscosity slurry". Thus, depending whether the viscosity of the slurry is above or below a given threshold, the control element 50 opens valve 23 and leaves valve 21 closed, or vice versa, respectively, so that the slurry flows from the first tank to the casting apparatus via the second flow-path 5 or via the first flow-path 4, using the second pump 7 or the first pump 6. Thus, the slurry uses only one of the two flow-paths at the time.

At the casting box 10, slurry 2 preferably maintains the same level. Further, at the casting box, the flow rate of the slurry coming from the first flow-path 4 or the second flow-path 5 is checked via sensor 80. Casting box 10 casts the slurry 2 onto movable support 20 which moves along casting direction 44 via casting blade 70.

Preferably, the viscosity of the slurry is continuously checked while casting takes place. Therefore, if the viscosity of the slurry varies, or the measured flow rate is outside a given range, the control element 50 may actuate valves 21 and 23, changing the flow-path used by the slurry to reach the casting box 10.

In the following, the method of operation of the casting apparatuses 101, 102 is outlined, mentioning only the differences with the method of operation of casting apparatus 100.

Casting apparatus 102 operates as casting apparatus 100, but there are three different flow-paths 4, 5, 34 that can be alternatively selected. There are three different pumps 6, 7, 35, each of which is preferably used for a different set of values of the viscosity of the slurry 2. For example the first pump 6 is preferably used for "low viscosity slurry", the second pump 7 is preferably used for "high viscosity slurry", while the fourth pump 35 is used for "intermediate viscosity slurry" comprised in a range of viscosity values between the high viscosity slurry and the low viscosity slurry. Thus, if the viscosity of the slurry is above a first threshold and below a second threshold, the control element 50 opens valve 36 and leaves valves 21 and 23 closed, so that the slurry flows from the first tank to the casting apparatus via the fourth flow-path 34 using the fourth pump 35. If the viscosity of the slurry is above the second threshold, the control element 50 opens valve 23 and leaves valves 21 and 36 closed, so that the slurry flows from the first tank to the casting apparatus via the second flow-path 5 using the second pump 7. If the viscosity of the slurry is below the first threshold, the control element 50 opens valve 21 and leaves valves 23 and 36 closed, so that the slurry flows from the first tank to the casting apparatus via the first flow-path 4, using the first pump 6. Thus, the slurry uses only one of the three flow-paths at the time. Therefore, after the viscosity of the slurry has been evaluated, one of the first flow-path 4, second flow-path 5 or fourth flow-path 34 is selected to direct the slurry from first tank 3 to casting box 10, where it is cast as in casting apparatus 100. A single flow-path is used for the transfer of the slurry from the tank to the casting box.

In the casting apparatus 101, the slurry is located in two tanks, first tank 3 and second tank 30. The first tank 3 is connected to the casting box 10 via the first flow-path 4 and the second flow-path 5 having first pump 6 and second pump 7, respectively. The second tank 30 is connected to the casting box via the third flow-path 11 and second flow-path 5, having third pump and second pump, respectively. Preferably, the first pump 6 and third pump 9 are suitable to be used for the same ranges of values of the viscosity of the slurry, while the second pump 5 in the second flow-path is suitable to be used with a different range of values of the viscosity of the slurry, for example for higher values of viscosity than the first pump and third pump. Thus, depending whether the viscosity of the slurry is above or below a given threshold, the control element 50 opens valves 21, 31 and leaves valves 23 and 33 closed, or vice versa, respectively, so that the slurry 2 flows from the first tank 3 and second tank 30 to the casting box 10 via the first flow-path 4 and third flow-path 11 using the first pump 5 and third pump 9, or the slurry 2 flows from the first tank 3 and second tank 30 to the casting box 10 via the second flow-path 5 using the second pump 7. Thus, from the two tanks, the slurry can flow to the casting box 10 via a single flow-path, that is, via the second flow-path 5, or via two different flow-paths at the same time, first flow-path 4 and third flow-path 11.

The invention claimed is:

1. A method for casting a sheet of a material containing alkaloids, the method comprising:

forming a slurry of the material containing alkaloids, the slurry having a viscosity value;

storing the slurry in a first tank;

providing a first flow-path and a second flow-path for fluid communication between the first tank and a casting box, the first flow-path comprising a first pump and the second flow-path comprising a second pump;

directing the slurry either along the first flow-path or along the second flow-path from the first tank to the casting box, defining a flow of slurry through the first flow-path or through the second flow-path, on the basis of the viscosity value of the slurry; and casting the slurry to obtain a sheet of material containing alkaloids.

2. The method according to claim 1, wherein the step of directing the slurry either along the first flow-path or along the second flow-path from the first tank to the casting box on the basis of the viscosity value of the slurry includes:

setting a threshold viscosity value;

directing the slurry along the first flow-path if the viscosity value of the slurry is below the threshold viscosity value; and directing the slurry along the second flow-path otherwise.

3. The method according to claim 1, wherein the slurry has a composition, and comprising one or more of:

measuring the viscosity value of the slurry in the first tank;

measuring the viscosity value of the slurry in the casting box;

measuring the viscosity value of the slurry in the first flow-path or second flow-path; and determining the viscosity value on the basis of the slurry's composition.

4. The method according to claim 3, comprising:

measuring or determining the viscosity value of the slurry more than once; and switching the flow of slurry from the first flow-path to the second flow-path, or vice-versa, in case of a variation of the viscosity value compared to a previous measurement or determination.

5. The method according to claim 1, comprising:

storing the slurry in a second tank;

providing a third flow-path for fluid communication between the second tank and the casting box, the third flow-path comprising a third pump;

connecting the second flow-path to the second tank, so that the second tank and the casting box are in fluid communication via the second flow-path; and directing the slurry either along the third flow-path or along the second flow-path from the second tank to the casting box on the basis of the viscosity value of the slurry.

6. The method according to claim 5, comprising:

measuring or determining the viscosity value of the slurry more than once; and switching both flows of slurry from the first flow-path and third flow-path to the second flow-path, or vice-versa, in case of variation of the viscosity value compared to a previous measurement or determination.

7. The method according to claim 4, wherein the flow of slurry entering in the casting box defines a flow-rate, comprising:

maintaining the flow rate of the slurry entering in the casting box substantially constant before and after the switching.

8. The method according to claim 1, wherein the first pump defines a first pump speed and the second pump defines a second pump speed, the method comprising:

measuring the first pump speed or the second pump speed;

measuring a flow rate of the slurry in the first flow-path or in the second flow-path; and switching the flow of slurry from the first flow-path to the second flow-path, or vice-versa, in case the measured flow rate of the slurry in the first flow-path or in the second flow-path is outside a given range for the respective measured first pump speed or second pump speed.

9. The method according to claim 1, wherein the first pump defines a first pump speed and the second pump defines a second pump speed, the method comprising:

measuring a flow rate of the slurry exiting the casting box or entering the casting box or in the first flow-path or in the second flow-path; and changing the first pump speed or second pump speed on the basis of the measured slurry flow rate.

10. A method for casting a sheet of a material containing alkaloids, the method comprising:

forming a slurry of the material containing alkaloids, the slurry having a viscosity value;

storing the slurry in a first tank;

providing a first flow-path and a second flow-path for fluid communication between the first tank and a casting box, the first flow-path comprising a first pump and the second flow-path comprising a second pump;

directing the slurry either along the first flow-path or along the second flow-path from the first tank to the casting box, defining a flow of slurry through the first flow-path or through the second flow-path, on the basis of the viscosity value of the slurry;

switching from one flow-path to the other depending on the density value of the slurry to obtain a substantially constant flow rate of the slurry in the casting box; and casting the slurry to obtain a sheet of material containing alkaloids.

* * * * *